Feb. 21, 1967 R. A. HATHAWAY 3,305,239

POSITION TRIP

Filed Oct. 19, 1964 2 Sheets-Sheet 1

INVENTOR.
Richard A. Hathaway
BY John J. Pederson
Atty.

INVENTOR.
Richard A. Hathaway
BY
John J. Pederson
Atty.

3,305,239
POSITION TRIP
Richard A. Hathaway, Des Plaines, Ill., assignor to Zenith Radio Corporation, Chicago, Ill., a corporation of Delaware
Filed Oct. 19, 1964, Ser. No. 404,674
5 Claims. (Cl. 274—10)

This invention relates, in general, to record changers adapted to automatically play records of varying diameters, and pertains more particularly to a new and improved assembly for initiating a record change cycle therein.

Ideally, reproduction should be accomplished with a fidelity equal to that of the recording and in a manner such that the recording is not in any way impaired or damaged, thus providing a theoretically infinite life for the recording disc. Unfortunately, in practice, inevitable damage to the recording is incurred, and it has been recognized that such wear is generally proportional to the mass of the tone arm and to the tracking pressure of the stylus. In the past several years tracking pressures have been reduced from roughly 20 to 2 grams and even greater reductions are entirely feasibly. Of course, further reductions will lead to even less record wear and provide longer record life. However, in the present state of the art, the lateral resistance of the tone arm to movement resulting from the trip mechanism customarily employed in automatic record changers precludes the realization of the added benefits of still lower tracking pressures. This conventional trip mechanism, which is velocity-responsive, usually comprises a trip link coupled to one of a pair of frictionally engaged levers located near the hub of the turntable. Inward movement of the tone arm slowly moves the trip link radially inward, causing the other of the frictional levers to contact with a lug positioned on the hub of the turntable. Since the inward rate of movement is relatively small during the playing period, the friction lever is brushed back by the hub lug on each revolution of the turntable. However, when the tone arm reaches the inner or "trip grooves" of the record, the velocity of its radial movement is greatly increased and the force exerted on the trip link positions the friction lever such that it engages the lug and initiates the change cycle. Thus in such a mechanism it is necessary for the tone arm to continually exert a force on the trip link and associated members and, at the end of the recording to supply a relatively large force to the trip link to actuate the change mechanism.

Obviously, the above described arrangement interferes with the lateral freedom of the tone arm. With tracking pressures of 2 grams or less, this lateral force is quite significant, often being sufficient to pull the stylus from the record grooves. At best, operation of the trip mechanism is erratic and the resulting tone arm "drag" accounts for increased record wear. In fact, the predisposition toward manual phonograph operation on the part of many record enthusiasts stems largely from a reluctance on their part to subject expensive recordings to the increased wear which generally accompanies automatic record changing operation.

A second disadvantage associated with velocity-responsive trip mechanisms relates to the "rejecting" operation for prematurely initiating the record change cycle. A reject mechanism customarily is mechanically coupled to the trip link and is actuated by mechanically turning a knob on the changer base plate. Because the changer is usually housed within a recess of the cabinet and the spindle may be laden with recording discs, access to the reject knob is often quite inconvenient. In addition, because of the delicate suspension of the base plate and turntable, the user often jars the apparatus when operating the reject mechanism, causing the stylus to jump out of the recording groove and slide along the surface of the record. This, of course, may result in damage to the recording disc.

Position trip mechanisms have been devised that avoid the imposition of a drag on the tone arm by initiating the change cycle at a predetermined radial position of the tone arm. However, heretofore such position trips have proved unsatisfactory for use on automatic machines adapted to play 7 inch—45 r.p.m., 10 inch—78 r.p.m. and 12 inch—33 r.p.m. records, as each of these types of records has, according to established recording standards, a different related inner diameter at which the recording is terminated. For instance, the program material on a 10 inch—78 r.p.m. record usually extends to an inner diameter at which the label of a 7-inch—45 r.p.m. record is found. Hence, a position trip set to function for a 10 inch—78 r.p.m. record will not trip a 7 inch—45 r.p.m. record.

Accordingly, it is an object of this invention to provide a new and improved assembly for actuating the record change cycle mechanism of an automatic phonograph.

It is another object of this invention to provide an actuating assembly of economical construction that automatically regulates the trip position according to the type of record to be played.

It is yet another object of this invention to provide a trip mechanism for an automatic record changer which accommodates different types and sizes of record discs while permitting the use of substantially lighter stylus tracking forces than previously required in such changer and providing a substantial improvement in the useful life of such record discs.

It is a further object of this invention to provide a trip mechanism which functions substantially independently of the tracking pressure of the stylus.

It is still a further object of this invention to provide an associated reject mechanism which overcomes the aforementioned objections of some prior art reject mechanisms.

In accordance with the invention, a position trip for a phonograph having a tone arm which is pivoted near one end and movable in a generally radial path between an outer diameter and a related inner diameter of a record to be transcribed and further having an automatic change mechanism for effectuating a record change cycle comprises means responsive to the record change mechanism for sensing the magnitude of the outer diameter. Also provided are first contact means movable along the path in correspondence with the movement of the tone arm, and second contact means which are disposed in the path at a position prescribed by the sensing means. In addition, actuating means, responsive to the engagement of the first and second contact means, are provided for initiating the change cycle.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
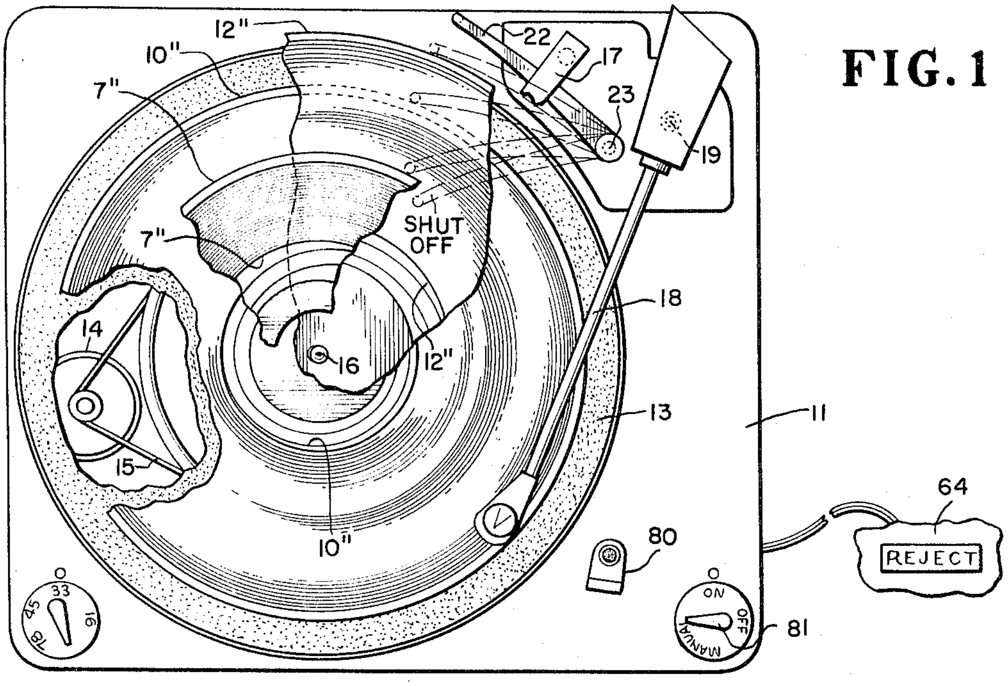
FIGURE 1 is a plan view, partly cut away, of an automatic record changer embodying the invention.
Figures 3, 4, 5:
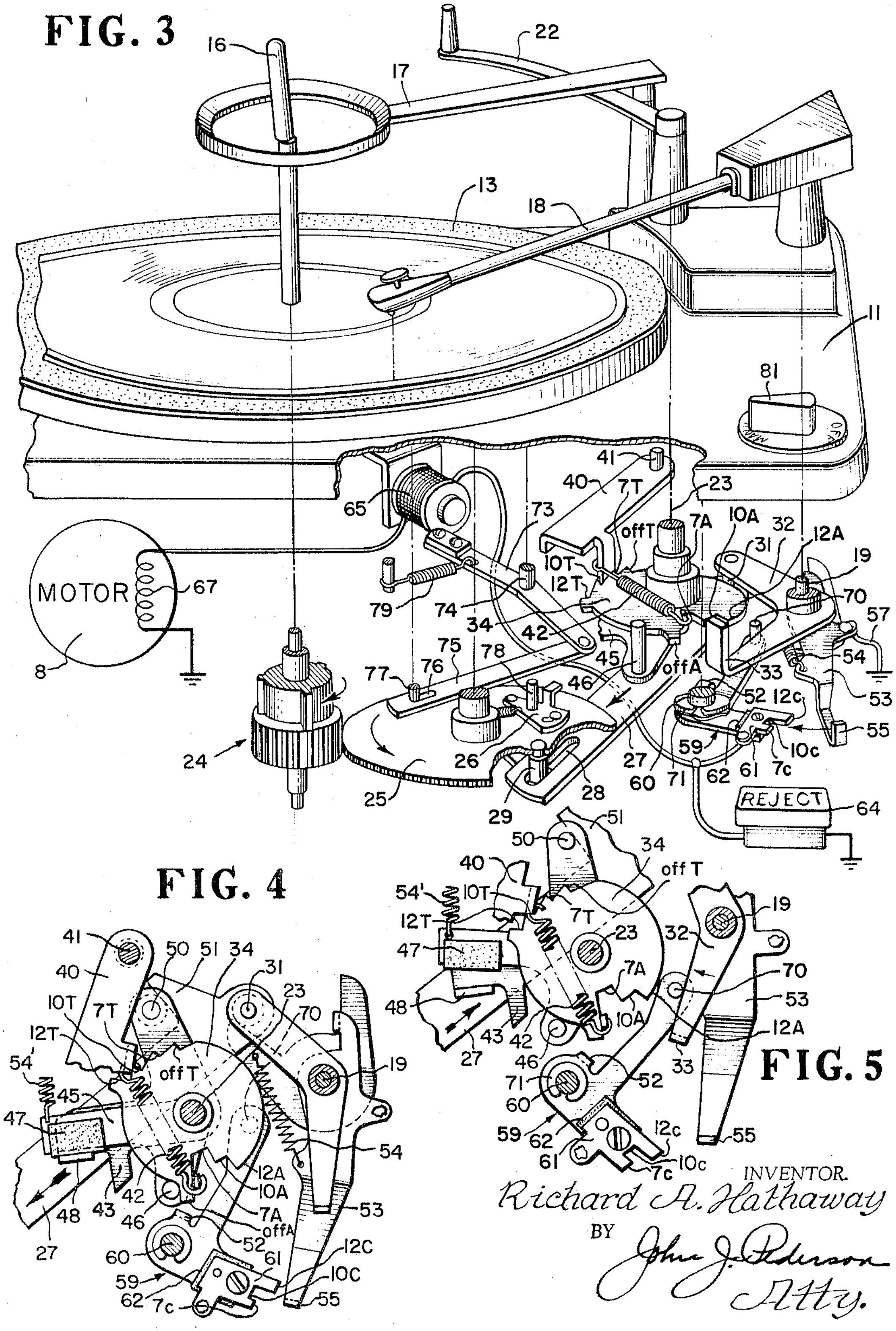
FIGURE 3 is a fragmentary perspective view of the position trip assembly and a part of the record changing mechanism shown as the tone arm is about to be placed on the commencement groove of a recording disc.
FIGURE 4 is a fragmentary plan view showing a portion of the position trip and record change assembly during one phase of the record change cycle.
FIGURE 5 is a view similar to that of FIGURE 4 but depicting a later phase of the record changing operation.

Referring now to FIGURES 1 and 3, the automatic record changer there represented includes a mounting base 11 upon which a turntable 13 is supported for rotation and driven by a driving wheel 14 which is coupled to turntable 13 by a belt 15. Wheel 14 has a motor drive which is shown schematically at 8 in FIGURE 3. The record changer further includes a center spindle 16 with an offset shoulder upon which records to be played are stacked, the records being held in a horizontal poistion by a leveler arm 17 which is attached to mounting base 11. A tone arm 18, which is fixed to a tone arm shaft 19 pivotally supported on mounting base 11, is adapted to engage the grooves of a record to be played in a manner well known in the art. A sensing arm 22 is pivotally mounted to the base by a shaft 23 and is shown in its reference or normal rest position outboard of turntable 13. Sensing arm 22 is also shown in FIGURE 1 in dashed outline in alternative positions engaging the peripheries of a 12 inch—33 r.p.m. record, a 10 inch—78 r.p.m. record and a 7 inch—45 r.p.m. record, and in a "shut-off" position to which it is moved during the record change cycle following the playing of the last record on the stack. Also shown in FIGURE 1 are the respective inner diameters of 7 inch—45 r.p.m., 10 inch—78 r.p.m. and 12 inch—33 r.p.m. records at which, according to current recording standards, the program material is terminated.

The following steps are usually involved in a record change cycle: (1) When the tone arm tracks to an inner diameter of a record at which the program material ends, the record change mechanism initiates a record change cycle which raises the tone arm to disengage its stylus from the played record. (2) The tone arm is moved outwardly to a position clear of the path of movement of a record traveling from the stack to a playing position on the turntable. (3) A record is released from the stack onto the turntable. (4) While the record is being released from the stack or just before its release, a sensing means is actuated to determine the size, i.e., the magnitude of the outer diameter of the record; in the present embodiment this is ensing arm 22 shown in FIGUREE 1. (5) The tone arm is moved back over the edge of the record to be played and then is lowered on the commencement groove of the record.

Figure 2:
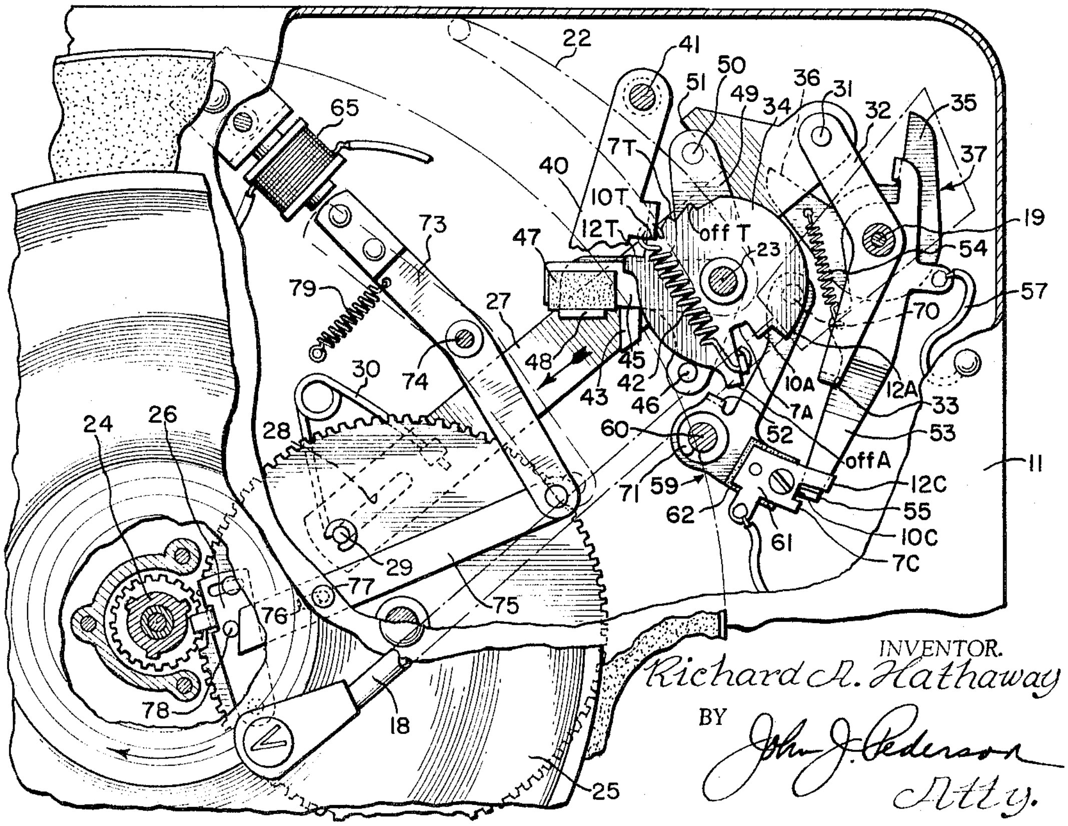
FIGURE 2 is a fragmentary plan view, partly in cross section, of an automatic change mechanism and position trip assembly constructed in accordance with a preferred embodiment of the invention, and shown as a record change cycle is initiated.

The change cycle mechanism for raising and lowering the tone arm, and releasing the records from the stack may be of any known construction and will be discussed only briefly. Referring to FIGURES 2 and 3, a hub gear 24 is affixed to turntable 13 and rotates freely within a mutilated section of a main gear 25 during the play of a record. However, at the end of a play a trip mechanism causes a lever 26 to be shifted within the gap of gear 25 to in effect fill its mutilation and cause gear 24 to engage gear 25. This initial engagement is the start of a record change cycle in which gear 24 rotates in a clockwise direction driving main gear 25 in a counterclockwise direction but for only one revolution.

The mechanism for moving the tone arm includes a drive link 27 having at one extremity an elongated slot 28 which receives a pin 29 eccentrically disposed on the underside of gear 25. A biasing spring 30 causes the pin normally to abut one end of slot 28 as shown. The opposite end of link 27 is provided with an upwardly protruding pin 31 which engages one end of an arm 32 that is supported for rotation about shaft 19. The other end of arm 32 includes a projecting tab 33 which is engageable with a tone arm locating member 34. Pin 31 is also positioned between legs 35 and 36 of an essentially U-shaped member 37 which is affixed at its bight end to shaft 19. Movement of link 27 in a direction shown by the arrow moves pin 31 against leg 36 to cause counterclockwise rotation of shaft 19 and tone arm 18; subsequent movement of link 27 in the opposite direction moves pin 31 against leg 35 to cause clockwise rotation of shaft 19 and tone arm 18. Suitable means, not shown, are provided for braking rotational movement of shaft 19 during a record change cycle to maintain adequate control of the tone arm movement.

While pivotal movement of tone arm 18 may be effected by displacement of link 27, it is also necessary that the arm be lifted and lowered at the start and completion of the record change cycle. To avoid undue complexity the mechanism accomplishing this function is not shown, but it will be recognized by those skilled in the art that any of a number of well known expedients will perform satisfactorily in conjunction with the illustrated change mechanism. For instance, a suitable lifting mechanism is shown in Patent No. 3,030,115, granted to Maurice E. Hardy et al., on April 17, 1962, and assigned to the same assignee as the present invention.

Again with reference to FIGURES 2 and 3, sensing means are provided to determine the outer diameter of the record to be played. In a preferred construction, sensing arm 22 is mounted for rotational displacement about a predetermined axis which is the axis of sensing arm shaft 23. Sensing arm 22, shown in its reference position in FIGURE 3, is moved during a record change cycle from its reference position to engage the periphery of a record, as previously discussed. Tone arm locating member 34 is rotatably mounted on shaft 23 and is located in a plane of movement of the projecting tab 33 on arm 32 so as to be contacted by the tab. Locating member 34 includes a series of stop abutments "of A," 7A, 10A and 12A angularly spaced about the center of shaft 23. Abutments 7A, 10A and 12A correspond to the different record sizes which the record changer is to accommodate, e.g., for playing 7 inch—45 r.p.m., 10 inch—78 r.p.m. and 12 inch—33 r.p.m. records. The "off A" stop abutment provides for automatic shut-off after the last record has been played or, as will subsequently be explained, for "true manual" operation of the phonograph.

Each stop abutment is arcuate in profile and concentric with axis 23 but spaced at a different radial distance from the axis. Stop abutment 7A is at the smallest radius and corresponds to the smallest size record, while stop abutment 12A is at the largest radius and corresponds to the largest size record. A stop abutment is placed in its operating position when it is rotated into the plane of movement of projecting tab 33 of arm 32. For example, in the accompanying illustrations stop abutment 10A is in its operating position.

Releasable locking means are also provided for retaining a selected stop abutment in its operating position. More particularly, locating member 34 includes, in addition to stop abutments 7A, 10A, 12A and "off A," ratchet teeth 7T, 10T, 12T and "off T." The teeth are engageable by a pawl 40 which is pivotally mounted on a pin 41 depending from base 11. Pawl 40 is biased in a counterclockwise direction by a spring 42 which is connected between the pawl and locating member 34. The same spring biases the locating member in a clockwise direction. Ratchet teeth "off T," 7T, 10T and 12T are spaced on the edge of member 34 to retain a selected stop abutment in its operating position when the correspondingly designated ratchet tooth is engaged by pawl 40. Thus, in the accompanying diagrams, the pawl is shown engaging tooth 10T, thus retaining stop abutment 10A in the path of movement of tab 33.

The limit of clockwise rotation of locating member 34 is where pawl 40 engages tooth 12T. This is the home position of the member 34 to which the mechanism is reset in a change cycle when sensing arm 22 is maintained in the reference position illustrated in FIGURE 1. The reset means includes a lower portion of pawl 40, not shown, which cooperates with forward movement, i.e., movement in the direction of the arrow shown in FIGURE 2, of trip link 27 at the beginning of a change cycle to cam pawl 40 out of engagement with tooth 7T, 10T or "off T" and allow member 34 to rotate clockwise to its home position. The somewhat elliptical path traversed by trip link 27 causes it to bypass pawl 40 during its return movement.

A unidirectional mechanical coupling is disposed between locating member 34 and sensing arm 22. It comprises a bell crank 45 having an upwardly projecting stud 46 a portion of which has a common plane of movement with the edge of the "off A" stop abutment. The other end of bell crank 45 includes a magnet 47 which is attractable to a tab 48 of a second bell crank 49. When sensing arm 22 is moved to engage the periphery of a record, bell crank 45 rotates in a counterclockwise direction moving stud 46 into engagement with the "off A" stop abutment to rotate member 34 counerclockwise. However, because of the magnetic coupling between bell cranks 45 and 49, clockwise movement of sensing arm 22 has no effect on member 34.

The other end of bell crank 49 has a downwardly extending stud 50 which is biased by suitable means, not shown, against abutment 51 extending from link 27. Movement of link 27 in the direction of the arrow rotates bell crank 49 counterclockwise; movement of the lever in the opposite direction rotates crank 49 clockwise. A detailed explanation of the structure and operation of the sensing apparatus just described is provided in the aforementioned Patent No. 3,030,115.

Although the above described sensing means represents a preferred construction, it will be recognized by those skilled in the art that the unique position trip to be described may, with only minor structural modifications, be adapted to co-operate with other arrangemens for sensing the size of the record played.

With the foregoing in mind and in accordance with the invention, a first contact arm 53 is mounted for rotation with shaft 19 and is adapted to move along a path in correspondence to the movement of tone arm 18. Arm 53 is biased in a clockwise direction against leg 35 of member 37 by a spring 54. An electrically conductive path is formed from an upwardly projecting tab 55 of arm 53 through a wire 57 to base plate 11, or ground; arm 53 is electrically insulated from other conductive members by insulating collars on shaft 19.

A second contact arm 59 is rotatably mounted on a shaft 60 depending from base plate 11. A spring washer 71 is provided for braking rotation of member 59 to maintain adequate control of its movement. Contact arm 59 comprises a conductive tab 61, electrically insulated from the bulk of second contact arm 59 by insulating pad 62, which includes a plurality of electrical contact surfaces 7C, 10C and 12C having a predetermined spaced relation. As is clearly shown in FIGURE 3, tab 61 is electrically coupled to ground by reject switch 64 and also by the series combination of an electromagnet 65 and a low voltage tap, or energizing source, 67 within motor 8.

The other end of second contact arm 59 includes an upwardly projecting stud 70 a portion of which lies in the plane of movement of arm 32. Movement of arm 32 in a clockwise direction rotates second contact arm counterclockwise and the engagement of arm 32 with stop abutment 7A, 10A or 12A positions second contact arm 59 such that a corresponding contact surface i.e., 7C, 10C or 12C respectively, is disposed in the path traversed by tab 55 of first contact arm 53. Thus the particular contact surface 7C, 10C or 12C which is placed in an operating position is dependent on whether a 7 inch, a 10 inch or a 12 inch record, respectively, is to be played.

The engagement of tab 55 with one of the contact surfaces completes an electrical circuit comprising tap, or energizing source, 67 and electromagnet 65. The energized electromagnetic means 65 attracts a link 73 causing its rotation about an axis defined by a shaft 74. Link 73 is coupled at one end to a second link 75 which is adapted for limited movement as defined by a slot 76. A shaft 77 depending from base plate 11 normally abuts one end of slot 76, as shown in FIGURE 3, due to the biasing action of a spring 79. As shown in FIGURE 2, clockwise rotation of link 73 forces link 75 into engagement with an upwardly protruding pin 78 on lever 26.

The operation of the position trip assembly of the invention will be described in the context of a record change cycle. Assume initialy that the record change mechanism is in the condition shown in FIGURE 2 wherein the tone arm 18 has just reached the termination grooves of a 10 inch—78 r.p.m. recording disc. Further assume that there is a 10 inch—78 r.p.m. record stacked on spindle 16 and it is the next record to be played.

When the tone arm reaches the end of the program material, the lever 26 is thrust into engagement with one of the lugs on gear 24 thus causing gear 24 to engage with single revolution gear 25. At this point the record change cycle has started. As gear 25 rotates, link 27 is pulled by pin 29 in the direction as shown by the arrow, moving the camming surface of link 27 (not shown) into engagement with pawl 40 to release the pawl and restore the tone arm locating member 34 to its home position. Movement of link 27 also moves pin 31 toward leg 36 of member 37. As this ocurs, and before pin 31 engages leg 36, the tone arm lifting means previously discussed raises the tone arm from the record. After the tone arm has been raised, pin 31 engages leg 36 to move the tone arm outwardly from spindle 16 past the edge of the turntable. At the same time sensing arm 22 is moved from its reference position to engage the periphery of the 10 inch record which is on the spindle 16. This is accomplished by the rotation of bell crank 49 by abutment 51 of link 27. This stage of operation is shown most clearly in FIGURE 4. Sensing arm 22 follows the counterclockwise motion of crank 49 since they are magnetically coupled. As sensing arm 22 is moved toward the periphery of the 10 inch record, projecting stud 46 of bell crank 45 engages locating member 34 and rotates stop abutment 10A counterclockwise towards its operating position. The simultaneous motion about shaft 23 of bell cranks 45 and 49 and locating member 34 continues until sensing arm 22 engages the periphery of the 10 inch record, placing abutment 10A in its operating position as shown in FIGURE 5. At this point movement of bell crank 45 is arrested by engagement of sensing arm 22 with the record. However, gear 25 continues to rotate, forcing bell crank 49 to continue in its counterclockwise path and thus the magnetic coupling between sensing arm 22 and the record changing mechanism is overcome; sensing arm 22 is immediately pulled back to its reference position by a biasing spring 54′ as is shown in FIGURE 5. Stop abutment 10A of locating member 34 is retained in its operating position by pawl 40 engaging ratchet tooth 10T. However, bell crank 49 continues to rotate under the influence of link 27 causing a finger 43 of the crank to engage edge 52 of contact arm 59, to rotate tab 61 to a home position without the path traversed by arm 53.

As gear 25 continues to rotate, it moves link 27 on a return stroke in the opposite direction to that shown by the arrow and thus moves pin 31 of the linkage towards engagement with leg 35. Before leg 35 is engaged, however, a release mechanism (not shown) which is connected to gear 25 drops the 10 inch record onto turntable 13. After the record has been dropped, pin 31 engages leg 35 to move tone arm 21 inwardly over the turntable. Simultaneously, with the return movement of link 27, arm 32 is caused to rotate towards abutment 10A engaging stud 70 and rotating second contact means 59 towards an operating position as is shown in FIGURE 5. Since link 27 has a path of movement which is somewhat elliptical the cam portion of the link clears pawl 40 on its return stroke and locating member 34 is thereby retained in an operating position.

As shown in FIGURE 3, tone arm 18 is positioned over the commencement grooves of the 10 inch record when projecting tab 33 of arm 32 engages stop abutment 10A of tone arm locating member 34. This engagement prevents further rotation of arm 32 and consequently of second contact arm 59 and positions contact surface 10*c* in the path of movement of tab 55 of first contact arm 53. The engagement also prevents any further movement of pin 31 and link 27. However, continued rotation of gear 25 is possible because of a lost motion coupling provided by spring 30 and slot 28. Further rotation of gear 25 causes operation of the tone arm lifting means (not shown) to lower the tone arm on the commencement groove of the record. The record change cycle is now complete.

During the ensuing play of the recording disc, arm 53 moves in an arcuate path in correspondence with the movement of tone arm 18; contact arm 53 engages contact surface 10*c* when tone arm 18 reaches the predetermined inner diameter of the recording disc. This engagement completes an electrical circuit from energizing source 67 through electromagnet 65 to ground. The energized electromagnet attracts link 73 thereby thrusting lever 26 into the path of the lugs on hub 24 to initiate a change cycle in the manner previously discussed. Of course, for a 7 inch or a 12 inch recording disc, contact surfaces 7C or 12C, respectively, is placed in an operating position and the aforesaid circuit is completed at correspondingly different radial positions of tone arm 18.

Of course, it is recognized that a change cycle may be initiated at any time during the play of a record by merely pressing reject button 64. The reject switch is an alternate path completing the electrical circuit formed by the engagement of contact arms 53 and 54. Because of the physical ease with which rejection is accomplished, it is unlikely the operator will jar the turntable, and the possibility may be totally eliminated by removing the reject button to a remote location.

After the play of the last record on the stack, the record changer shuts-off automatically. This operation occurs in the following manner: as the tone arm tracks to the end of the recording, the trip mechanism causes gear 25 to be engaged by gear 24 and the tone arm is moved outwardly over the record as explained above. Sensing arm 22 moves toward spindle 16 and since its movement is not arrested by a record on the spindle it moves to the automatic "shut-off" position as shown in the dashed outline in FIGURE 1. The "off-A" abutment of locating member 34 is therefore placed in its operating position where it is retained by pawl 40 throughout the remainder of the "off" cycle. As tone arm 18 attempts to swing inwardly, projecting tab 33 of arm 32 is immediately engaged by the "off-A" abutment retaining tone arm 18 in a "set-down" position above a tone arm rest post 80 shown in FIGURE 1. This limits the movement of link 27 in a direction opposite to that of the arrow to the largest extent of any stop abutment since the "off-A" abutment extends farthest from shaft 23. The limitation of reverse movement of link 27 causes the link to intersect with an arm of a shut-off mechanism (not shown). In an ordinary record change cycle no engagement occurs since abutments 7A, 10A and 12A allow a greater amount of reverse movement of link 27 thus shifting the path of movement of link 27 away from the shut-off mechanism.

The "off-A" abutment also facilitates "true manual" operation of the phonograph. This operation is accomplished as follows: the immediate restraint of arm 32 by the "off-A" abutment prevents the engagement of stud 70 of second contact arm 59 with arm 32. Hence second contact arm 59 remains in its home position shown in FIGURE 5, retaining all the contact surfaces without the path of first contact arm 53. Automatic shut-off is avoided by rotating a control knob 81 from an "automatic" to a "manual" setting. This moves the automatic shut-off mechanism away from the path of link 27 thereby precluding shut-off. To play a record the tone arm is manually positioned by the user on the commencement groove of the recording and is manually lifted at the end of a recording. However, even during "true manual" operation of the phonograph automatic reject may still be accomplished by means of reject switch 64.

Thus the invention provides a new and improved trip mechanism of economic construction which functions independent of a tone arm actuating force, thereby eliminating a primary objection to automatic record changer operation, i.e., increased record wear. Also the invention provides for "true manual" operation, a desirable feature not often available on automatic record changers. Finally, the associated reject mechanism operates with only a slight touch and in addition may easily be placed off the changer base plate in a more convenient location, e.g., in a centralized control panel.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A position trip for a phonograph having a tone arm which is pivoted near one end and movable in a generally radial path between an outer diameter and a related inner diameter of the record to be transcribed and further having an automatic record change mechanism for effectuating a record change cycle comprising:
   - means responsive to said record change mechanism for sensing the magnitude of said outer diameter;
   - first contact means movable along a path in correspondence to the movement of said tone arm;
   - second contact means disposed in said path at a position prescribed by said sensing means;
   - and actuating means responsive to the engagement of said first and second contact means for initiating said change cycle.

2. A position trip for a phonograph having a tone arm which is pivoted near one end and movable in a generally radial path between an outer diameter and a related inner diameter of the record to be transcribed and further having an automatic record change mechanism for effectuating a record change cycle comprising:
   - sensing means comprising a sensing arm having a reference position and movable during a record change cycle from such position to engage the periphery of said record for sensing the magnitude of said outer diameter, and a locating member having a series of stop abutments and movable with said sensing arm to position a selected one of said stop abutments in an operating position;
   - first contact means movable along a path in correspondence with the movement of said tone arm;
   - second contact means comprising a plurality of contact surfaces having a reference position and movable during a record change cycle from such position for disposing one of said surfaces in said path;
   - and actuating means responsive to the engagement of said first and second contact means for initiating said change cycle.

3. A position trip for a phonograph having a tone arm which is pivoted near one end and movable in a generally radial path between an outer diameter and a related inner diameter of the record to be transcribed and further having an automatic record change mechanism for effectuating a record change cycle comprising;

means responsive to said record change mechanism for sensing the magnitude of said outer diameter;

first contact means comprising an electrical contact mechanically coupled to said tone arm and movable along a path in correspondence with the movement of said tone arm;

second contact means comprising a plurality of electrical contact surfaces having a predetermined spaced relation, having a reference position and movable during a record change cycle to a position prescribed by said sensing means;

electrical circuit means including an electromagnetic device electrically coupled to said second contact means, said device adapted to be energized upon the completion of an electrical circuit formed by the engagement of said first and second contact means;

and actuating means responsive to the energization of said device for initiating said change cycle.

4. A position trip for a phonograph having a tone arm which is pivoted near one end and movable in a generally radial path between an outer diameter and a related inner diameter of the record to be transcribed and further having an automatic record change mechanism for effectuating a record change cycle comprising:

means responsive to said record change mechanism for sensing the magnitude of said outer diameter;

first contact means comprising an electrical contact coupled to said tone arm and movable along a path in correspondence with the movement of said tone arm;

second contact means, comprising an electrical contact, disposed in said path at a position prescribed by said sensing means;

electrical circuit means including an electromagnetic device electrically coupled to said second contact means, said device adapted to be energized upon the completion of an electrical circuit formed by the engagement of said first and second contact means;

an actuating means responsive to the energization of said device for initiating said change cycle;

and an electrical switch shunting said first and second contact means for providing an alternate path to complete said circuit independent of the engagement of said first and second contact means.

5. A position trip for a phonograph having a tone arm which is pivoted near one end and movable in a generally radial path between an outer diameter and a related inner diameter of the record to be transcribed and further having an automatic record change mechanism for effectuating a record change cycle comprising:

sensing means comprising a sensing arm having a reference position and movable during a record change cycle from such position to engage the periphery of said record for sensing the magnitude of said outer diameter, and a locating member having a series of stop abutments and movable with said sensing arm to position a selected one of said stop abutments in an operating position;

first contact means comprising an electrical contact mechanically coupled to said tone arm and movable along a path in correspondence with the movement of said tone arm;

second contact means comprising a plurality of electrical contact surfaces having a predetermined spaced relation, having a reference position and adapted for rotational displacement about a fixed axis;

an indexing arm movable with said tone arm during a record change cycle to rotatably displace said second contact means to a position determined by the engagement of said arm and selected abutment for disposing one of said plurality of contacts in said path;

electrical circuit means including an electromagnetic device electrically coupled to said second contact means, said device adapted to be energized upon the completion of an electrical circuit formed by the engagement of said first and second contact means;

an actuating lever pivoted about a fixed axis and rotatably displaceable in response to the energization of said device for initiating said change cycle;

and an electrical switch shunting said first and second contact means for providing an alternate path to complete said circuit independent of the engagement of said first and second contact means.

References Cited by the Examiner

UNITED STATES PATENTS

| | | | |
|---|---|---|---|
| 2,527,586 | 10/1950 | Small | 274—10 |
| 2,555,478 | 6/1951 | Emde et al. | 274—10 |
| 2,762,626 | 9/1956 | Carlson | 274—14 |

References Cited by the Applicant

UNITED STATES PATENTS

| | | |
|---|---|---|
| 2,287,726 | 6/1942 | Cranmer. |
| 2,965,377 | 12/1960 | De Boer. |
| 2,983,515 | 5/1961 | Vistain. |

NORTON ANSHER, *Primary Examiner.*

J. F. PETERS, JR., *Assistant Examiner.*